United States Patent
Alman et al.

(10) Patent No.: US 11,635,098 B2
(45) Date of Patent: Apr. 25, 2023

(54) PNEUMATIC ACTUATOR END CAP HAVING AN INTEGRAL VOLUME BOOSTER

(71) Applicant: Fisher Controls International LLC, Marshalltown, IA (US)

(72) Inventors: Paul Taylor Alman, Marshalltown, IA (US); Jason Gene Olberding, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/029,753

(22) Filed: Sep. 23, 2020

(65) Prior Publication Data
US 2022/0090612 A1    Mar. 24, 2022

(51) Int. Cl.
  *F15B 15/14*    (2006.01)
  *B33Y 80/00*    (2015.01)
  *F16K 31/122*    (2006.01)
  *F15B 15/20*    (2006.01)

(52) U.S. Cl.
  CPC ........ *F15B 15/1433* (2013.01); *F15B 15/149* (2013.01); *F15B 15/202* (2013.01); *F16K 31/122* (2013.01); *B33Y 80/00* (2014.12)

(58) Field of Classification Search
  CPC .. F15B 15/1433; F15B 15/149; F15B 15/202; B33Y 80/00; F16K 31/122
  See application file for complete search history.

(56) References Cited

U.S. PATENT DOCUMENTS

| | | | | |
|---|---|---|---|---|
| 3,079,900 | A * | 3/1963 | Hunnicutt | F15B 15/1433 91/290 |
| 3,674,041 | A * | 7/1972 | Beals | F15B 15/1433 137/625.6 |
| 8,631,826 | B2 * | 1/2014 | Lovell | F15B 15/00 137/625.66 |
| 8,689,832 | B2 * | 4/2014 | Lovell | F15B 13/0405 137/625.66 |
| 8,807,168 | B2 * | 8/2014 | Lovell | F16K 47/08 137/625.66 |

(Continued)

OTHER PUBLICATIONS

Fisher, "Fisher 3025 Sizes P462, P460-200, and P900 Diaphragm Actuator," [https://www.emerson.com/documents/automation/product-bulletin-fisher-3025-sizes-p462-p460-200-p900-diaphragm-actuator-en-127234.pdf], Product Bulletin, Sep. 2017, 12 pages.

(Continued)

*Primary Examiner* — Dustin T Nguyen
(74) *Attorney, Agent, or Firm* — Hanley, Flight & Zimmerman, LLC

(57) ABSTRACT

Methods, apparatus, systems and articles of manufacture are disclosed that produce a pneumatic actuator end cap having an integral volume booster. An example pneumatic actuator end cap includes a first cavity to provide a first fluid passageway to receive a pressurized fluid from a source external to the pneumatic actuator end cap, a second cavity to provide a second fluid passageway to route the pressurized fluid to an internal chamber of a pneumatic actuator in which a piston is disposed, and a third cavity containing a fluid valve to control a flow of the pressurized fluid between the first fluid passageway and the second fluid passageway.

14 Claims, 9 Drawing Sheets

(56) References Cited

U.S. PATENT DOCUMENTS 10,525,955 B2 * 1/2020 Inoue .................... F16K 15/145
2020/0191174 A1 * 6/2020 Tam ................... F15B 15/1457

OTHER PUBLICATIONS

Emerson, Bettis G-Series Pneumatic Valve Actuator, [https://www.emerson.com/en-us/catalog/bettis-sku-g-series-pneumatic], 4 pages.
Voxeljet, "Investment casting using voxeljet 3d printed parts," [https://www.youtube.com/watch?v=UJvjlB0rAUs&feature=youtu.be], 3 pages.
China National Intellectual Property Office, "Notice to Grant a Pent for Utility Model" issued in connection with Chinese Patent Application No. 202122287159.4 dated Jan. 12, 2022, 2 pages (English Translation Included).

* cited by examiner

US 11,635,098 B2

PNEUMATIC ACTUATOR END CAP HAVING AN INTEGRAL VOLUME BOOSTER

FIELD OF THE DISCLOSURE

This disclosure relates generally to part manufacturing and, more particularly, to a pneumatic actuator end cap having an integral volume booster.

BACKGROUND

Additive manufacturing (AM) refers to manufacturing techniques that build three-dimensional (3D) objects by repeatedly layering material on top of and substantially parallel to a base layer. Additive manufacturing allows for 3D digital models of parts (e.g., generated by a 3D scanner, created using computer-aided design (CAD) software, etc.) to be produced rapidly without the need for custom tooling. Additive manufacturing techniques include material jetting, binder jetting, material extrusion, powder bed fusion (PBF), and sheet lamination. Depending on the specific technique used, additively manufactured parts may be composed of metals, plastic, polymers, organic compounds and/or ceramics.

SUMMARY

An example pneumatic actuator end cap includes a first cavity to provide a first fluid passageway to receive a pressurized fluid from a source external to the pneumatic actuator end cap, a second cavity to provide a second fluid passageway to route the pressurized fluid to an internal chamber of a pneumatic actuator in which a piston is disposed, and a third cavity containing a fluid valve to control a flow of the pressurized fluid between the first fluid passageway and the second fluid passageway.

A pneumatic actuator system including a cylinder including a piston, and an end cap coupled to the cylinder, the end cap including cavities defining at least a portion of a pneumatic volume booster, the cavities to provide fluid passageways to control a flow of pressurized fluid within the system.

A method including forming a first cavity of a portion of a pneumatic volume booster, the first cavity to provide a first fluid passageway to receive a pressurized fluid from an external source, forming a second cavity of the portion of the pneumatic volume booster, the second cavity to provide a second fluid passageway to route the pressurized fluid to an internal chamber of a pneumatic actuator, and forming a third cavity of the portion of the pneumatic volume booster, the third cavity to control a flow of the pressurized fluid between the first fluid passageway and the second fluid passageway.

Figure 1:
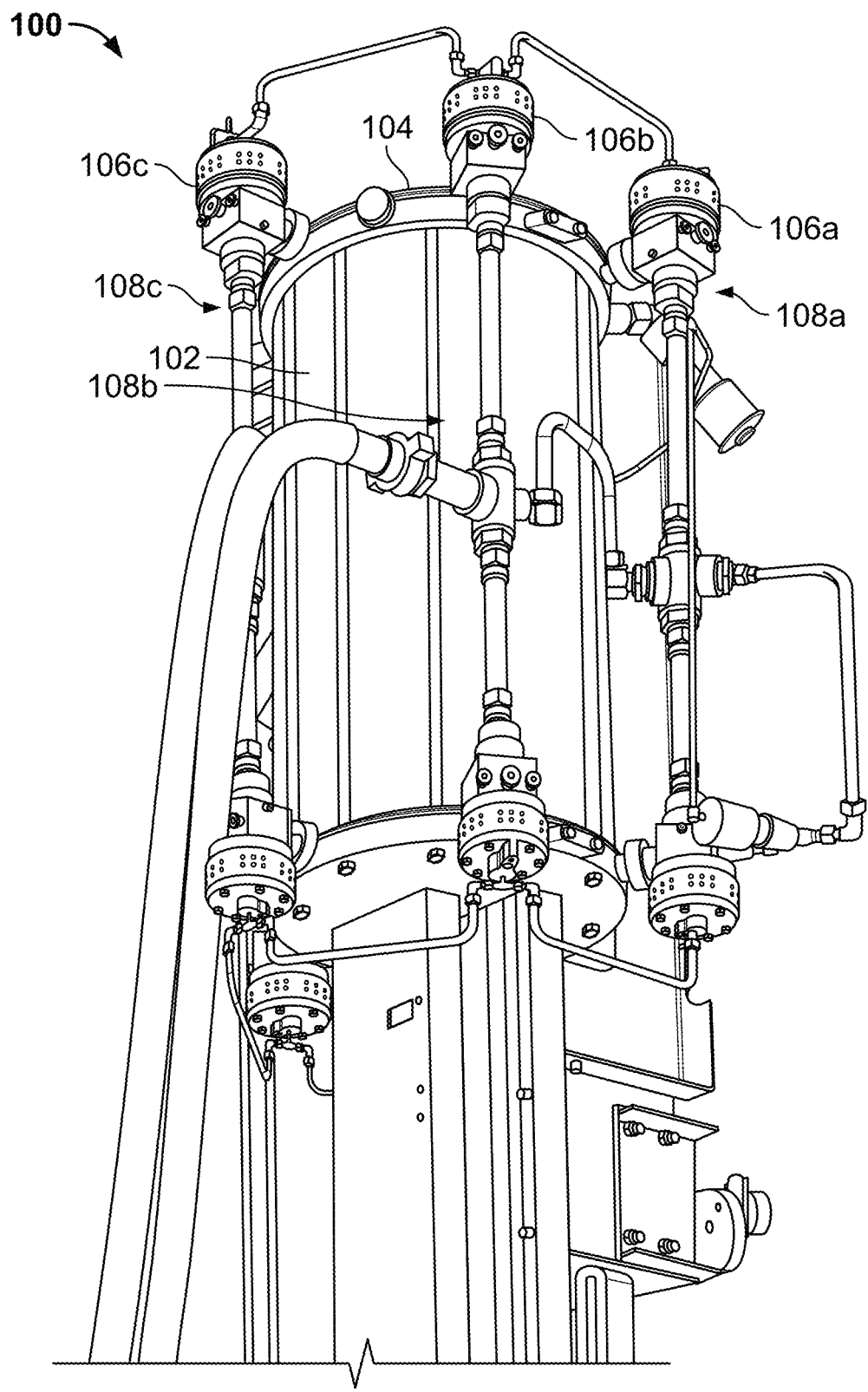
FIG. 1 illustrates a pneumatic actuator system.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

DETAILED DESCRIPTION

Mechanical systems often include actuators to cause and/or otherwise control movement of a mechanical part. As used herein, an actuator refers to a component, device, and/or other part implemented in a system to convert input energy (e.g., electric energy, hydraulic pressure, pneumatic pressure, etc.) into mechanical force. An actuator may be an electric actuator in which the input energy is electrical current, a hydraulic actuator in which the input energy is hydraulic pressure, a pneumatic actuator in which the input energy is air pressure, etc. Some applications require piston actuators controlled using air pressure as the input energy. In such cases, the piston actuators often require longer strokes and/or increased stroking speeds. To achieve such requirements, applications often use one or more volume boosters. As used herein, a volume booster refers to a component used in conjunction with a pneumatic and/or other piston actuator to increase the stroking speed of the actuator.

When installing a volume booster to a system, the volume booster is often mounted to the actuator using multiple tubes, fittings, etc. In instances in which multiple volume boosters are implemented, the number of tubes, fittings, etc., increases significantly. As a result, the configuration and installation of the system becomes complex, difficult, and expensive.

Examples disclosed herein overcome such complexities and related expenses by additively manufacturing endcaps of a piston actuator. In this manner, the endcaps of the piston actuator can be formed to include the main body and associated air passageways of the volume booster integrated therein. In other examples disclosed herein, the example actuator end cap constructed in accordance with the teachings of this disclosure may be used in conjunction with any suitable actuator such as, for example, a spring actuator and/or a diaphragm actuator.

In some examples disclosed herein, the endcap is additively manufactured in a modular manner, thereby enabling additional endcaps to support additional volume boosters to be efficiently installed. In this manner, additional endcaps can be placed on an existing additively manufactured end cap such that both endcaps and their respective volume boosters can cooperate to supply air to the actuator.

Alternatively, some examples disclosed herein include additively manufacturing a single endcap of a pneumatic actuator to include multiple main bodies and corresponding air fittings for multiple corresponding volume boosters.

Examples disclosed herein substantially eliminate the need to provide excess air tubes, fittings, air connections, and holes after a pneumatic actuator is manufactured. Thus, examples disclosed herein improve reliability, reduce cost, reduce weight, and enable efficient maintenance of pneumatic actuators that include one or more volume boosters. Additionally, examples disclosed herein improve maintenance of pneumatic actuators that include one or more volume boosters because upgrades and/or changes to an existing pneumatic actuator can be made by exchanging endcaps, as opposed to disassembling and reassembling an entire volume booster system.

FIG. 1 illustrates a pneumatic actuator system 100. The pneumatic actuator system 100 includes an actuator body 102, an actuator end cap 104, volume boosters 106a, 106b, and 106c, and volume booster tubing 108a, 108b, and 108c. As shown in FIG. 1, the actuator body 102 and the actuator end cap 104 are manufactured separately, then later assembled. Depending on the design requirements, the volume boosters 106a, 106b, and 106c are subsequently installed.

In FIG. 1, to install the volume boosters 106a, 106b, and 106c, the volume booster tubing 108a, 108b, and 108c is installed after the actuator body 102 and actuator end cap 104 are manufactured and assembled. That is, to install the volume boosters 106a, 106b, 106c, openings are drilled into the actuator end cap 104 to receive a portion of the volume boosters 106a, 106b, 106c. Additionally, to complete installation of each of the volume boosters 106a, 106b, and 106c, complex tubing such as the volume booster tubing 108a, 108b, and 108c is formed and installed around the actuator body 102.

Often, to install the volume booster tubing 108a, 108b, 108c, different types of connections, fittings, and angled tubing are used to ensure the actuator system 100 operates correctly. This results in a complex and expensive installation process. Further, to perform maintenance on the actuator system 100, the entire assembly of the volume booster tubing 108a, 108b, 108c is often disassembled and later reassembled. For example, in the event one of the volume boosters 106a, 106b, 106c is replaced, the complex tubing surrounding the actuator body 102 is disassembled piece by piece, later to be reassembled in place.

Figure 2A:
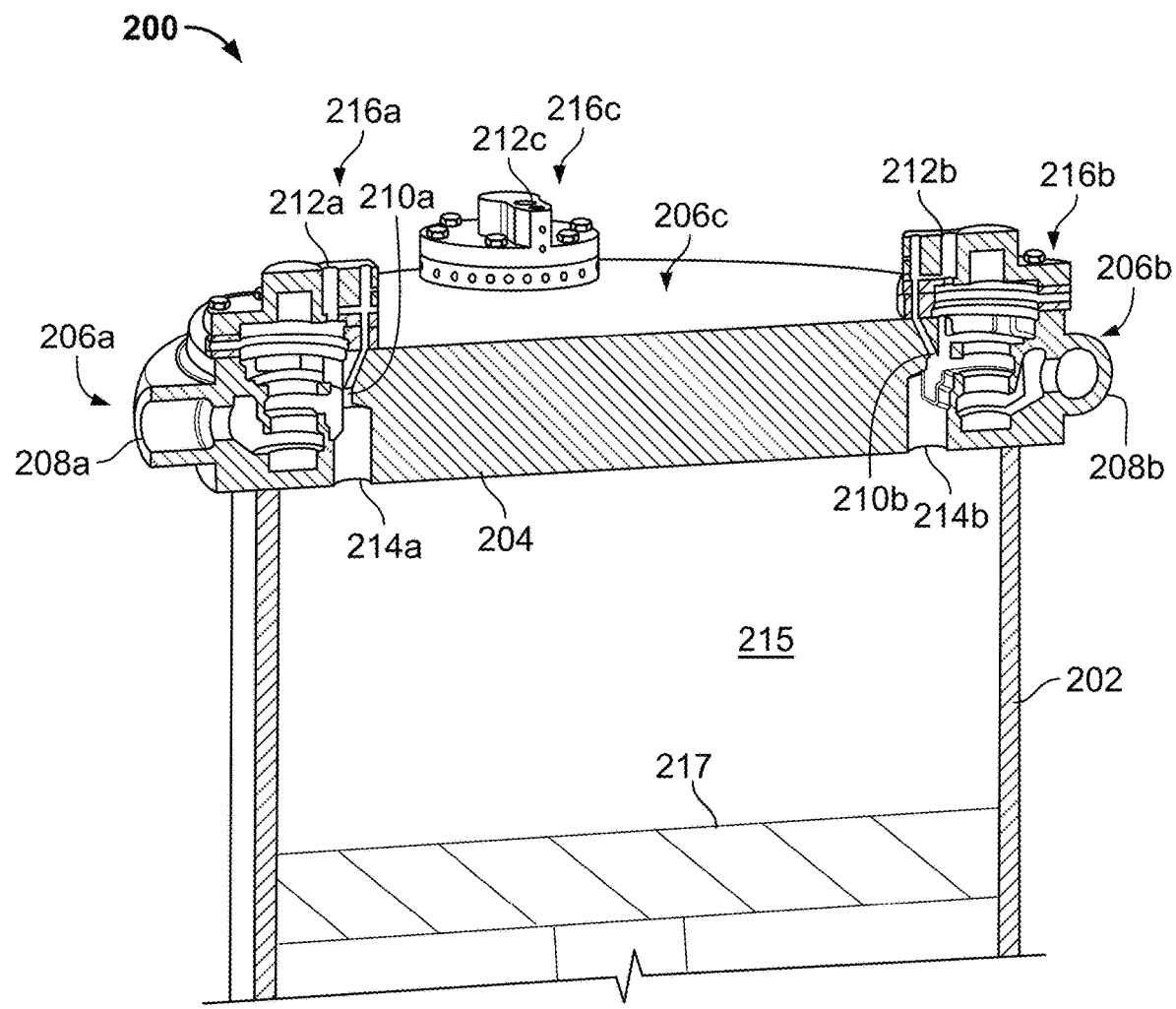
FIG. 2A illustrates a cross-sectional view of an example actuator system constructed in accordance with the teachings of this disclosure.

FIG. 2A illustrates a cross-sectional view of an example actuator system 200 constructed in accordance with the teachings of this disclosure. The example actuator system 200 includes an actuator body 202 and an example additively manufactured actuator end cap 204. The actuator system 200 is a pneumatic actuator system.

In FIG. 2A, the actuator body 202 is a cylindrical steel body (e.g., a steel cylinder). In other examples disclosed herein, the actuator body 202 may be produced using any suitable type of material. Additionally, in other examples disclosed herein, the actuator body 202 may be any produced in any suitable cross-sectional shape such as, for example, an oval or a rectangle. When assembled, the actuator body 202 may be coupled to the actuator end cap 204 using a welding technique such as, for example, gas metal arc welding (GMAW) (e.g., MIG welding), gas tungsten arc welding (GTAW) (e.g., TIG welding), shielded metal arc welding (SMAW), or flux cored arc welding (FCAW). In other examples disclosed herein, the actuator body 202 may be coupled to the actuator end cap 204 using any suitable fastening technique such as, for example, a screw, a bolt, a threaded core, etc. For example, in some examples disclosed herein, the actuator body 202 may be a tube with a threaded outer diameter to receive a corresponding threaded inner surface of the actuator end cap 204.

In the example of FIG. 2A, the actuator end cap 204 is an additively manufactured end cap. The actuator end cap 204 may be a top end cap or a bottom end cap of the actuator body 202. The actuator end cap 204 may be manufactured using any suitable additive manufacturing technique. For example, the actuator end cap 204 may be manufactured using powder bed fusion (PFB) composed of partially fused or unfused powder. As used herein, "partially fused powder" refers to powder material that is not melted to the full density of the completely fused material. In some examples, the actuator end cap 204 can instead be manufactured using any (or combination of) other suitable additive manufacturing techniques (e.g., VAT photopolymerization, material jetting, binder jetting, material extrusion, powder bed fusion, sheet lamination, directed energy deposition, sand cast using printed molds, etc.). In some examples, the actuator end cap 204 can instead be manufactured by hybrid manufacturing techniques (e.g., techniques that include standard/subtractive manufacturing techniques and additive manufacturing techniques). Alternatively, the actuator end cap 204 may be produced using any suitable manufacturing techniques such as, for example, a machining process using a solid plate or raw material, a sand cast process using molds produced by patterns, an investment cast process using a wax pattern produced from tooling, an investment cast process using a plastic or a polymethyl methacrylate (PMMA) pattern produced via additive processes, a weld fabrication process using any combination of the above-mentioned techniques, and/or production process using directed energy deposition (DED) technology. In some examples, the actuator end cap 204 can be subjected to any suitable post-processing (e.g., sanding, painting, etc.).

The material used to additively manufacture the actuator end cap 204 can be any suitable material. In some examples, the selection of the material may depend on what additive manufacturing technique is used to manufacture the actuator end cap 204. For example, the material can be a polymer, plastic, composite, metal, organic material, etc.

In FIG. 2A, the actuator end cap 204 includes example volume booster assemblies 206a, 206b, 206c additively manufactured therein. For example, the volume booster assemblies 206a, 206b, 206c include various portions of a volume booster (e.g., a main body of a volume booster) additively manufactured integrally with the actuator end cap 204. While not shown, the volume booster assembly 206c is manufactured in a manner similar to the volume booster assemblies 206a, 206b. In examples disclosed herein, any suitable portion and/or other section of a volume booster may be additively manufactured in the actuator end cap 204.

To manufacture the actuator end cap 204 and the volume booster assemblies 206a, 206b, 206c, layers of material are deposited substantially parallel with a previous layer of material. As used herein, "substantially parallel" refers to measurements within three degrees to a reference plane (e.g., if a plane is substantially parallel to a reference plane, it is oriented between 3° and −3° relative to the reference plane).

For example, the material (e.g., polymer, plastic, composite, metal, organic material, etc.) can be drawn through a nozzle of a material extrusion apparatus, heated and deposited onto a base to form a base layer thereon. Once the base layer has been deposited, the base layer of the material is solidified. For example, the base layer of the first material can solidify as it cools. In other examples, the base layer of the material can be solidified by thermal, electric and/or any other suitable method (e.g., exposure to UV light). In some examples, the base layer can be composed of multiple layers of the material.

In the above-mentioned example, another layer of the material is deposited substantially parallel to the base layer, the layer having an internal void forming a cross-section of a portion of the volume booster assemblies 206a, 206b, 206c. For example, the same process used to deposit the base layer can be used to deposit this layer. In other examples, any other suitable method can be used to deposit this layer. Such a process is repeated until the actuator end cap 204 including the volume booster assemblies 206a, 206b, 206c additively manufactured therein have been fully formed.

In the example of FIG. 2A, the volume booster assemblies 206a, 206b, 206c include example respective supply ports 208a, 208b, example respective control valve cavities 210a, 210b, example respective input ports 212a, 212b, 212c, and example respective output ports 214a, 214b. While not shown, an additional supply port, control valve cavity, and output port are included in the volume booster assembly 206c. The supply ports 208a, 208b form integral passageways between the volume booster assemblies 206a, 206b, 206c and a pneumatic air pressure source external to the actuator system 200. In examples disclosed herein, each of the supply ports 208a, 208b forms a cavity to provide a fluid passageway to receive the air (e.g., a fluid) from the pneumatic air pressure source external to the actuator system 200. The control valve cavities 210a, 210b each form a cavity containing a fluid control valve to control the flow of air between the supply ports 208a, 208b, and the output ports 214a, 214b. The input ports 212a, 212b, 212c are included in a portion of example volume booster attachments 216a, 216b, 216c. A more defined description of the volume booster attachments 216a, 216b, 216c is provided below.

The example output ports 214a, 214b form integral passageways between the volume booster assemblies 206a, 206b, 206c and the actuator body 202. In this manner, each of the output ports 214a, 214b forms a cavity to provide a fluid passageway to route the air input through the supply ports 208a, 208b to the actuator body 202. For example, the output port 214a forms a cavity to provide a fluid passageway to route the pressurized fluid to an internal chamber 215 of the pneumatic actuator in which a piston 217 is disposed.

In examples disclosed herein, the actuator end cap 204 may be post-processed. For example, support material can be removed using machining, a chemical bath, etc. The actuator end cap 204 may undergo surface finishing such as sanding, painting, epoxy finish, polishing, vapor smoothing, electroplating, bead blasting, etc. In some examples, if the actuator end cap 204 was produced in smaller pieces, the complete end cap can be formed by combining these parts using cold welding. In some examples, surface indicia (e.g., part identification indicia) can be added to the actuator end cap 204. For example, a sticker can be adhered to the actuator end cap 204. In some examples, surface indicia can be placed during the surface finishing of the actuator end cap 204. Additionally, or alternatively, surface indicium can be etched into a surface of the actuator end cap 204. In some examples, the actuator end cap 204 can be machined and/or added to an assembly (e.g., assembled with the actuator body 202).

The example illustrated in FIG. 2A includes example volume booster attachments 216a, 216b, 216c. The volume booster attachments 216a, 216b, 216c form a portion of a volume booster coupled to the volume booster assemblies 206a, 206b, 206c. When assembled, the volume booster attachments 216a, 216b, 216c are coupled to the actuator end cap 204. More specifically, the volume booster attachments 216a, 216b, 216c are coupled to the volume booster assemblies 206a, 206b, 206c when assembled. In operation, the input ports 212a, 212b, 212c are configured to receive a pilot signal (e.g., a pressurized air flow) to regulate the volume output through the output ports 214a, 214b.

In examples disclosed herein, the volume booster attachments 216a, 216b, 216c are produced using any suitable material such as, for example, polymer, plastic, composite, metal, etc. In examples disclosed herein, the volume booster attachments 216a, 216b, 216c are produced using the same material as the actuator end cap 204 and, thus, the volume booster assemblies 206a, 206b, 206c. Additional detail of the volume booster assemblies 206a, 206b, 206c and the volume booster attachments 216a, 216b, 216c is described below in connection with FIG. 3.

In the example of FIG. 2A, any suitable number of cavities may be implemented to define the portion of the volume booster assemblies 206a, 206b, 206c additively manufactured within the actuator end cap 204. Likewise, in examples disclosed herein, and suitable number of volume booster assemblies may be additively manufactured in the actuator end cap 204. In such examples, the volume booster assemblies may be additively manufactured in any suitable configuration.

In some examples disclosed herein, the actuator end cap 204 of FIG. 2A is additively manufactured in a modular manner. In such an example, additional actuator endcaps to support additional volume boosters can be placed on the actuator end cap 204 to cooperate to supply air to the actuator body 202.

Figure 2B:
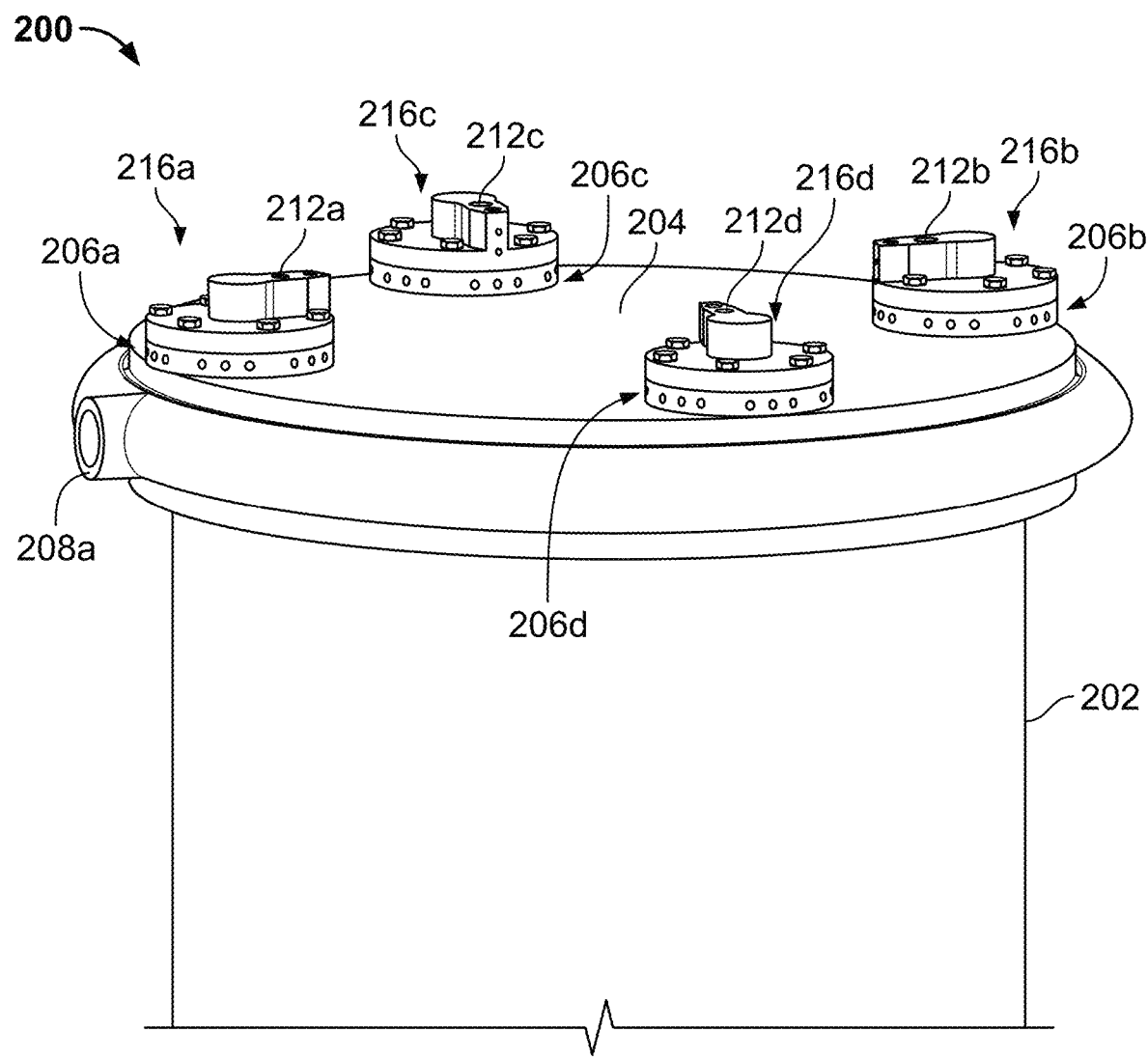
FIG. 2B illustrates the actuator system of FIG. 2A constructed in accordance with the teachings of this disclosure.

FIG. 2B illustrates the actuator system 200 of FIG. 2A constructed in accordance with the teachings of this disclosure. FIG. 2B illustrates the actuator body 202, the actuator end cap 204, the volume booster assemblies 206a, 206b, 206c, the supply port 208a, the input ports 212a, 212b, 212c, and the volume booster attachments 216a, 216b, and 216c of FIG. 2A. The illustration of FIG. 2B further illustrates an example volume booster assembly 206d, an example input port 212d, and an example volume booster attachment 216d of an additional example volume booster. The actuator system 200 of FIG. 2B may be constructed in accordance with the teachings of this disclosure.

Figure 3:
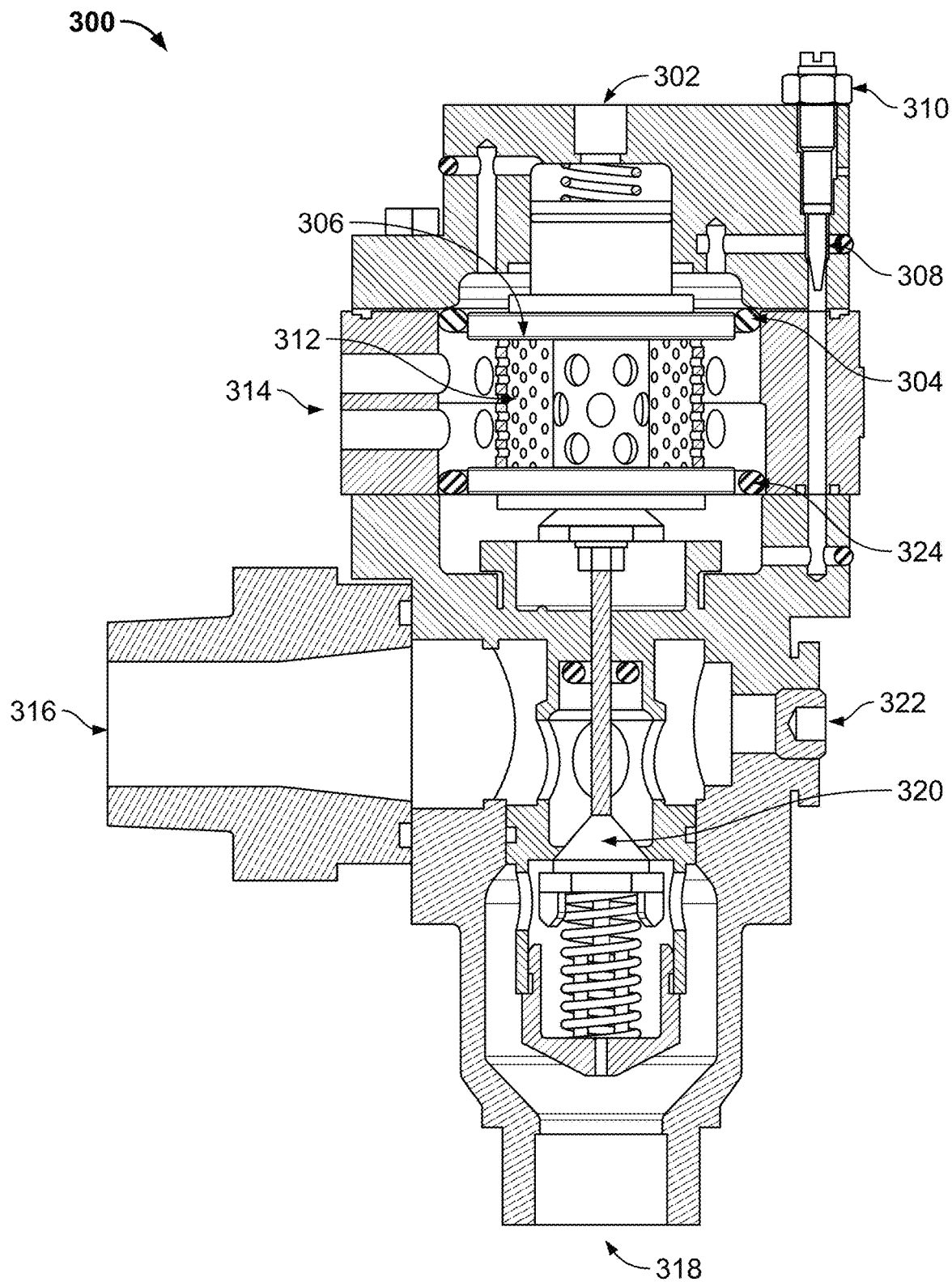
FIG. 3 is a cross-sectional view of an example volume booster constructed in accordance with the teachings of this disclosure.

FIG. 3 is a cross-sectional view of an example volume booster 300 constructed in accordance with the teachings of this disclosure. In FIG. 3, the volume booster 300 includes an example input signal port 302, an example input diaphragm 304, an example diaphragm assembly 306, an example bypass valve 308, an example bypass adjusting screw 310, an example noise attenuating trim 312, example exhaust passages 314, an example output port 316, an example supply port 318, an example supply passage 320, an example connector 322, and an example feedback diaphragm 324.

In the example of FIG. 3, the input signal port 302, the input diaphragm 304, the diaphragm assembly 306, the bypass valve 308, the bypass adjusting screw 310, the noise attenuating trim 312, and the exhaust passages 314 may represent the volume booster attachments 216a, 216b, 216c of FIGS. 2A and/or 2B. For example, the input signal port 302 of FIG. 3 may correspond to any of the input ports 212a, 212b, 212c of FIGS. 2A and/or 2B. Additionally, the output port 318, the supply port 316, the supply passage 320, the example connector 322, and the feedback diaphragm 324 may represent the volume booster assemblies 206a, 206b, 206c of FIGS. 2A and/or 2B. For example, the supply port 318 of FIG. 3 may correspond to any of the supply ports 208a, 208b of FIGS. 2A and/or 2B. In another example, the bypass valve 308 and the bypass adjusting screw 310 of FIG. 3 may be implemented by any of the control valve cavities 210a, 210b of FIGS. 2A and/or 2B. In yet another example, the output port 316 may be implemented by any of the output ports 214a, 214b of FIGS. 2A and/or 2B.

That is, the bypass valve 308, the output port 316, the supply port 318, the supply passage 320, and the example connector 322 correspond to portions of the volume booster 300 that may be additively manufactured within an actuator end cap (e.g., the actuator end cap 204 of FIGS. 2A and/or 2B) in accordance with the teachings of this disclosure. In some examples disclosed herein, any of the input signal port 302, the diaphragm assembly 306, the noise attenuating trim 312, and the exhaust passages 314 may also be additively manufactured in accordance with the teachings of this disclosure.

In operation, the input signal port 302 may be coupled to receive a pneumatic control signal, such an energy source (e.g., air pressure), for use as a pilot input source to regulate the output of the volume booster 300. Similarly, the supply port 318 may be coupled to an external energy source generator (e.g., an air compressor) configured to receive such an energy source (e.g., air pressure) for use in a pneumatic actuator system. For example, the volume booster 300 may be used in conjunction with the actuator system 200 of FIGS. 2A and/or 2B. When operating, the supply energy source (e.g., air pressure) is input through the supply port 318. Depending on the pressure of the energy source (e.g., air pressure) input through the input signal port 302, the input diaphragm 304, the diaphragm assembly 306, and the feedback diaphragm 324 are configured to amplify the energy source (e.g., air pressure) from the supply port 318 to be output through the output port 316, thus increasing actuator stroking speed.

Illustrated in FIG. 3, the input diaphragm 304, the diaphragm assembly 306, and the feedback diaphragm 324 may further amplify the output from the supply port 318 through the supply passage 320. Further in such an example operation, the volume booster 300 includes an integral bypass restriction, the bypass valve 308. In operation, the bypass adjusting screw 310 can be adjusted to tune the response of the volume booster 300 to small and/or large changes in the input energy source (e.g., air pressure). In operation, the noise attenuating trim 312 ensures that air is exhausted quietly from the volume booster 300 through the exhaust passages 314. Further, the connector 322 ensures that several integrated diagnostic connections of the volume booster 300 can be made. Such connections allow for diagnostic testing, actuator bypass assembly hook-up for use with hand wheel operated actuators, and/or multiple accessory connections.

Figure 4:
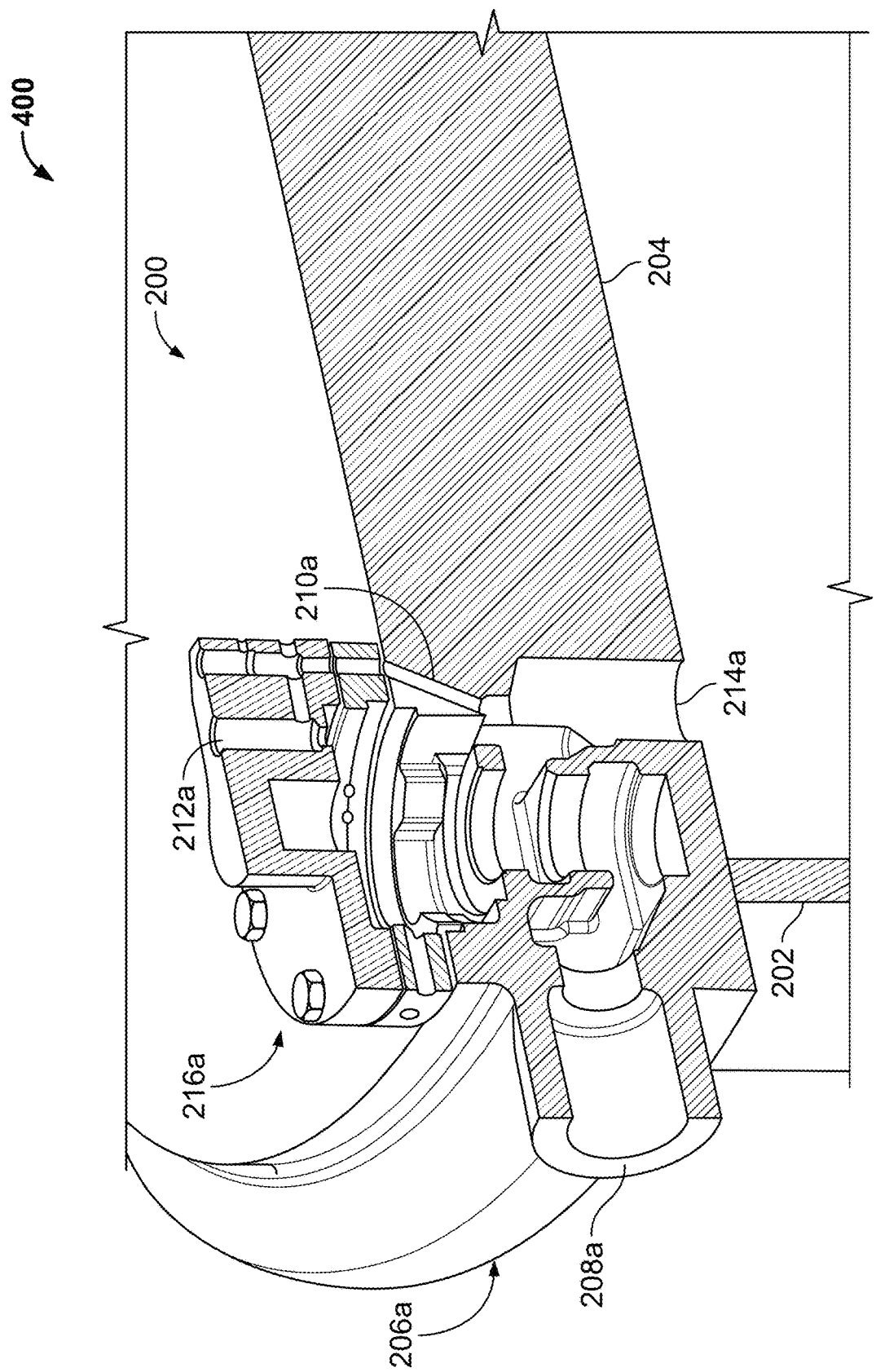
FIG. 4 is an enlarged cross-sectional view illustrating a portion of the actuator system of FIGS. 2A and 2B constructed in accordance with the teachings of this disclosure.

FIG. 4 is an enlarged cross-sectional view 400 illustrating a portion of the actuator system 200 of FIGS. 2A and 2B constructed in accordance with the teachings of this disclosure. FIG. 4 illustrates the actuator body 202, the actuator end cap 204, the volume booster assembly 206a, the supply port 208a, the control valve cavity 210a, the input port 212a, the output port 214a, and the volume booster attachment 216a.

Figure 5:
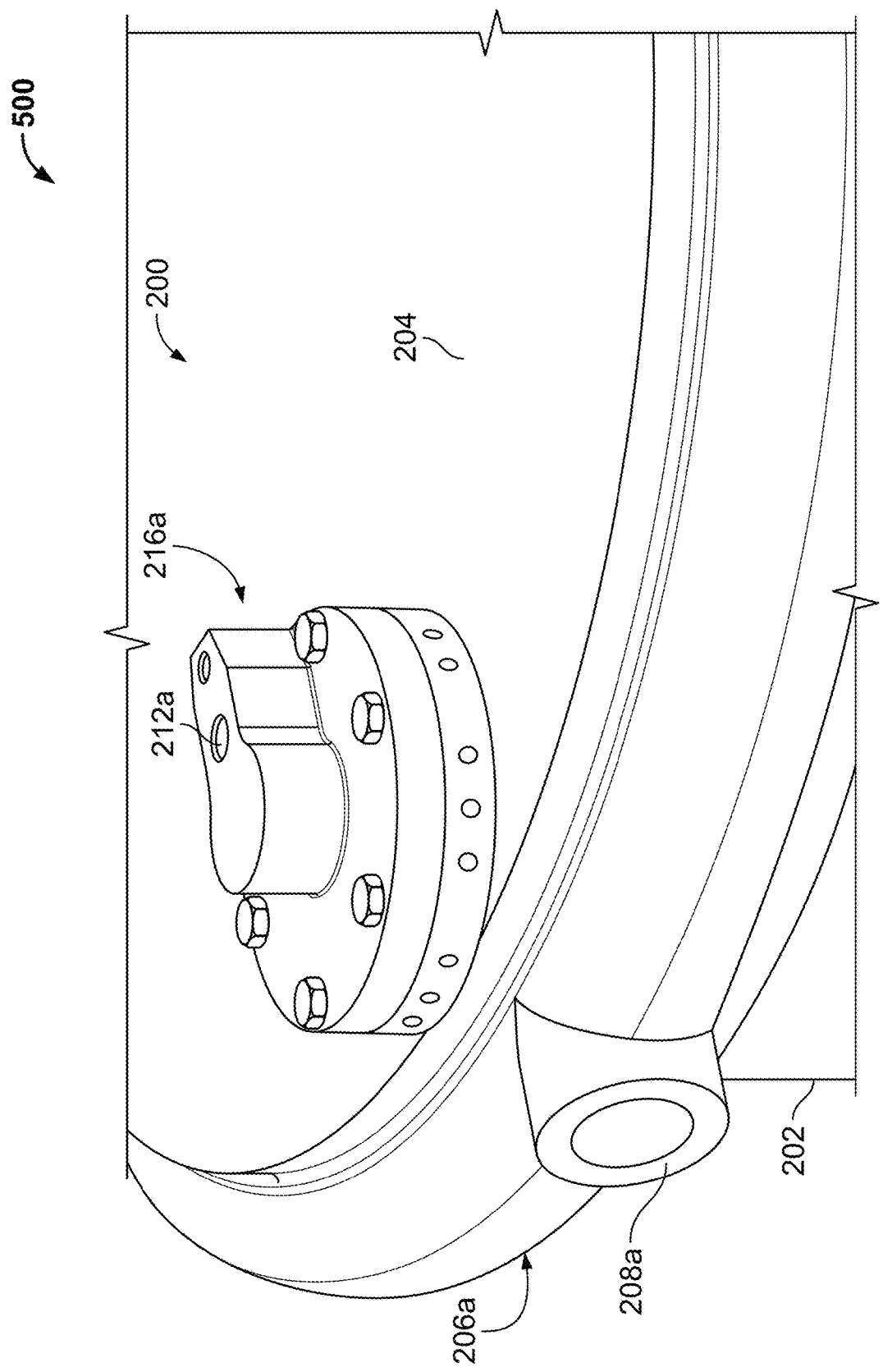
FIG. 5 is an enlarged view illustrating a portion of the actuator system of FIGS. 2A and 2B constructed in accordance with the teachings of this disclosure.

FIG. 5 is an enlarged view 500 illustrating a portion of the actuator system 200 of FIGS. 2A and 2B constructed in accordance with the teachings of this disclosure. FIG. 5 illustrates the actuator body 202, the actuator end cap 204, the volume booster assembly 206a, the supply port 208a, the input port 212a, and the volume booster attachment 216a.

Figure 6:
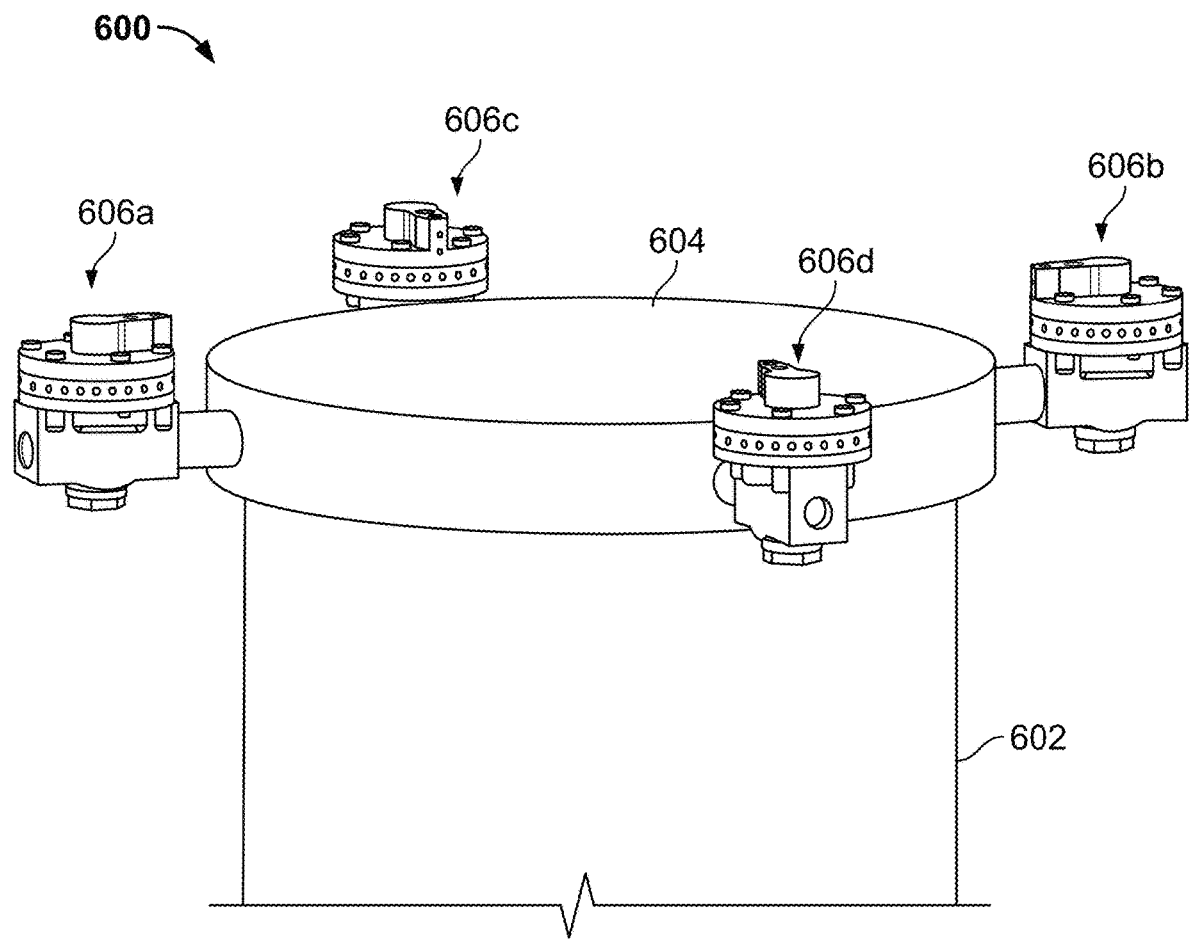
FIG. 6 illustrates another example actuator system including four volume boosters constructed in accordance with the teachings of this disclosure.

FIG. 6 illustrates another example actuator system 600 including four volume boosters constructed in accordance with the teachings of this disclosure. The actuator system 600 of FIG. 6 includes an example actuator body 602, an example actuator end cap 604, and example volume booster attachments 606a, 606b, 606c, 606d. The actuator system 600 is a pneumatic actuator system.

The actuator system 600 of FIG. 6 is constructed in accordance with the teachings of this disclosure. For example, the actuator end cap 604 is an additively manufactured end cap. The volume booster attachments 606a, 606b, 606c, 606d illustrate a different volume booster attachment than shown in FIGS. 2A, 2B, 4, and/or 5. For example, the volume booster attachments 606a, 606b, 606c, 606d may form another type of volume booster.

Figure 7:
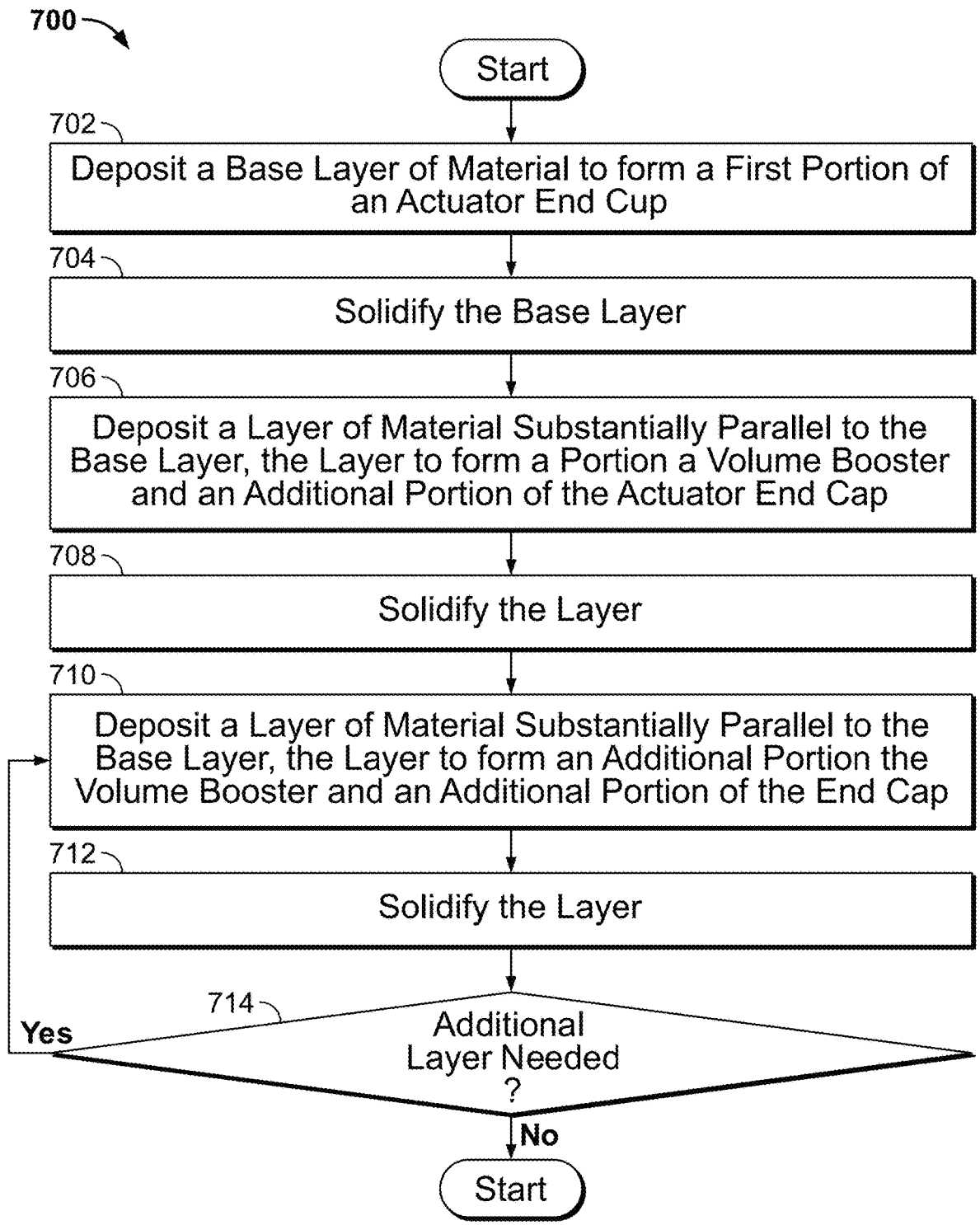
FIG. 7 is a flowchart representative of an example method of manufacturing the example actuator end cap of FIGS. 2A, 2B, 4, 5, and/or 6.

FIG. 7 is a flowchart representative of an example method 700 of manufacturing the example actuator end cap 204 and/or 604 of FIGS. 2A, 2B, 4, 5, and/or 6. The method 700 can be implemented using material extrusion techniques, material jetting techniques and/or any other suitable additive manufacturing techniques.

At block 702, a base layer of material is deposited to form a first portion of an actuator end cap. For example, the base layer may form a first portion of the actuator end cap 204 and/or 604 of FIGS. 2A, 2B, 4, 5, and/or 6. For example, the material can be drawn through a nozzle of a material extrusion apparatus, heated and deposited onto a base platform.

At block 704, the base layer of the material is solidified. For example, the base layer of the material can solidify as it cools. In some examples, the base layer can be composed of multiple layers of the material.

At block 706, a layer of material is deposited substantially parallel to the base layer, the layer to form a portion a volume booster and an additional portion of the actuator end cap. For example, the layer may form an additional portion of the actuator end cap 204 and/or 604 of FIGS. 2A, 2B, 4, 5, and/or 6 and a portion of the volume booster assemblies 206a, 206b, 206c, 206d of FIGS. 2A, 2B, and/or 4, and/or a portion of the volume booster assembly of FIG. 6.

At block 708, the layer of material is solidified. For example, the layer of the material can solidify as it cools. In some examples, the layer can be composed of multiple layers of the material.

At block 710, a layer of material is deposited substantially parallel to the base layer, the layer to form an additional portion the volume booster and an additional portion of the end cap. For example, the layer may form an additional portion of the actuator end cap 204 and/or 604 of FIGS. 2A, 2B, 4, 5, and/or 6 and a portion of the volume booster assemblies 206a, 206b, 206c, 206d of FIGS. 2A, 2B, and/or 4, and/or a portion of the volume booster assembly of FIG. 6.

At block 712, the layer of material is solidified. For example, the layer of the material can solidify as it cools. In some examples, the layer can be composed of multiple layers of the material.

At block 714, if another layer is to be layered, the method 700 returns to block 710. If another layer is not to be layered, the method 700 ends.

Figure 8:
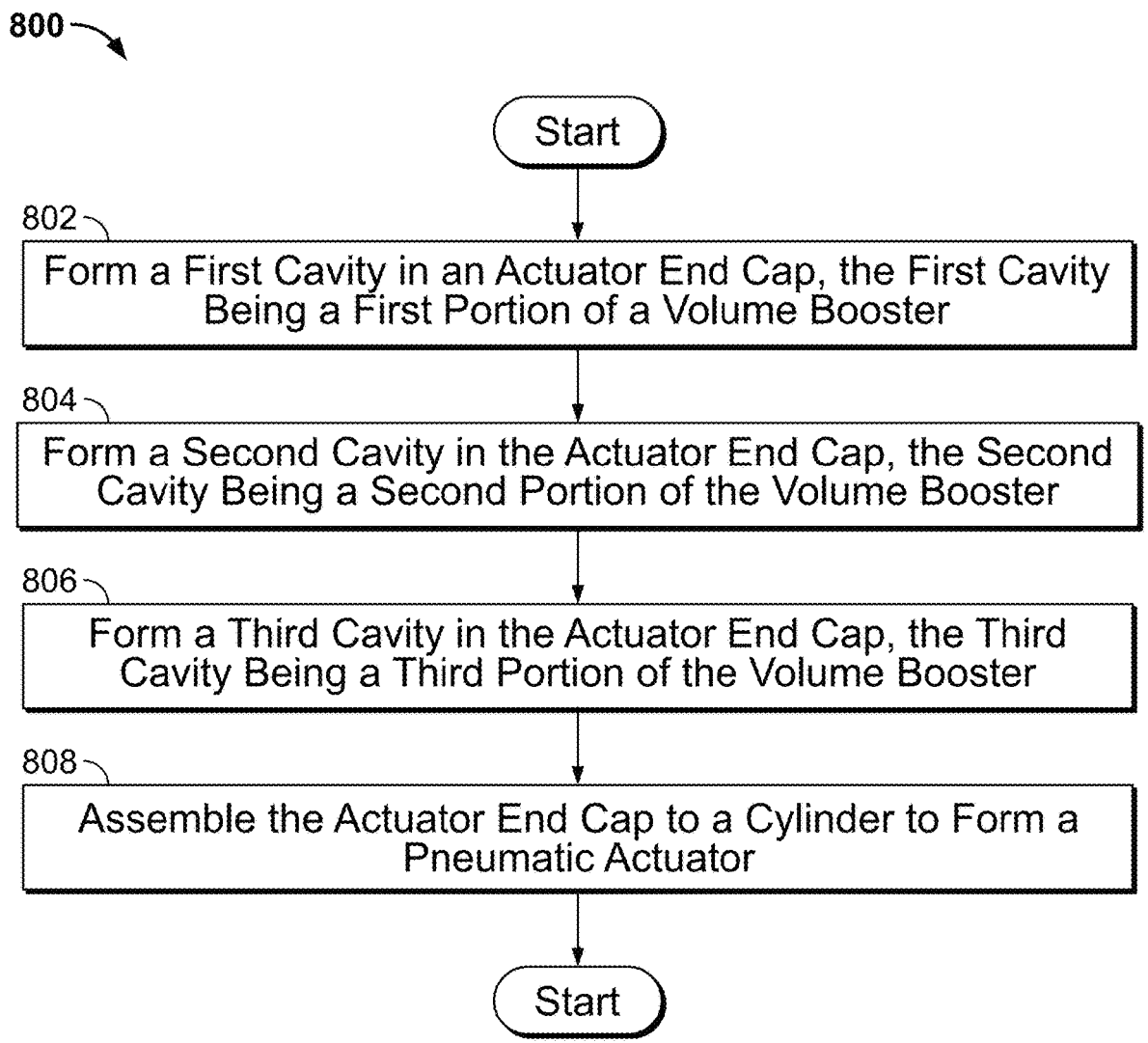
FIG. 8 is a flowchart representative of an example method of manufacturing the example actuator end cap of FIGS. 2A, 2B, 4, 5, and/or 6.

FIG. 8 is a flowchart representative of an example method 800 of manufacturing the example actuator end cap 204 and/or 604 of FIGS. 2A, 2B, 4, 5, and/or 6. The method 800 can be implemented using material extrusion techniques, material jetting techniques and/or any other suitable additive manufacturing techniques.

At block 802, a first cavity in an actuator end cap is formed, the first cavity being a first portion of a volume booster. For example, the first cavity may form one of the supply ports 208a, 208b, 208c, 318, 608 of the actuator end cap 204 and/or 604 of FIGS. 2A, 2B, 4, 5, and/or 6. In such an example, the first cavity may be formed to provide a first fluid passageway to receive a fluid (e.g., air) from a source external to the actuator end cap.

At block 804, a second cavity in the actuator end cap is formed, the second cavity being a second portion of the volume booster. For example, the second cavity may form one of the output ports 214a, 214b, 316 of the actuator end cap 204 and/or 604 of FIGS. 2A, 2B, 4, 5, and/or 6. In such an example, the second cavity may be formed to provide a provide a second fluid passageway to route the pressurized fluid to an actuator body (e.g., the actuator body 202 and/or 602 of FIGS. 2A, 2B, 4, 5, and/or 6) of a pneumatic actuator in which a piston is disposed.

At block 806, a third cavity in the actuator end cap is formed, the third cavity being a third portion of the volume booster. For example, the third cavity may form one of the control valve cavities 210a, 210b of the actuator end cap 204 and/or 604 of FIGS. 2A, 2B, 4, 5, and/or 6, and/or the bypass valve 308 and bypass adjusting screw 310 of FIG. 3. In such an example, the third cavity may include a fluid valve to control a flow of the pressurized fluid between the first fluid passageway and the second fluid passageway.

At block 808, the actuator end cap (e.g., the actuator end cap 204 and/or 604 of FIGS. 2A, 2B, 4, 5, and/or 6) is assembled to a cylinder (e.g., the actuator body 202 and/or 602 of FIGS. 2A, 2B, 4, 5, and/or 6) to form a pneumatic actuator. The method 800 then ends.

Although the example method 700, 800 is described with reference to the flowcharts illustrated in FIGS. 7 and/or 8, many other methods of implementing the example actuator end cap 204 and/or 604 of FIGS. 2A, 2B, 4, 5, and/or 6 may alternatively be used. For example, the order of execution of the blocks may be changed, and/or some of the blocks described may be changed, eliminated, or combined.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example methods, apparatus, systems, and articles of manufacture for a pneumatic actuator end cap having an integral volume booster are disclosed herein. Further examples and combinations thereof include the following:

Example 1 includes a pneumatic actuator end cap comprising a first cavity to provide a first fluid passageway to receive a pressurized fluid from a source external to the pneumatic actuator end cap, a second cavity to provide a second fluid passageway to route the pressurized fluid to an internal chamber of a pneumatic actuator in which a piston is disposed, and a third cavity containing a fluid valve to control a flow of the pressurized fluid between the first fluid passageway and the second fluid passageway.

Example 2 includes the pneumatic actuator end cap of example 1, further including a fourth cavity, a fifth cavity, and a sixth cavity.

Example 3 includes the pneumatic actuator end cap of example 2, wherein the fourth cavity is to provide a third fluid passageway to receive the pressurized fluid from the source, the fifth cavity is to provide a fourth fluid passageway to route the pressurized fluid to the internal chamber, the sixth cavity containing a second fluid valve to control a second flow of the pressurized fluid between the third fluid passageway and the fourth fluid passageway.

Example 4 includes the pneumatic actuator end cap of example 1, wherein the first cavity, the second cavity, and the third cavity form a portion of a volume booster.

Example 5 includes the pneumatic actuator end cap of example 4, wherein the portion is a first portion, the first portion configured to receive a second portion of the volume booster.

Example 6 includes a pneumatic actuator system comprising a cylinder including a piston, and an end cap coupled to the cylinder, the end cap including cavities defining at least a portion of a pneumatic volume booster, the cavities to provide fluid passageways to control a flow of pressurized fluid within the system.

Example 7 includes the pneumatic actuator system of example 6, wherein the pneumatic volume booster is a first pneumatic volume booster, the cavities further defining at least a portion of a second pneumatic volume booster.

Example 8 includes the pneumatic actuator system of example 7, wherein the cavities defining the portion of the second pneumatic volume booster provide second fluid passageways to control a second flow of the pressurized fluid within the system.

Example 9 includes the pneumatic actuator system of example 6, wherein the portion of the pneumatic volume booster is a body of the pneumatic volume booster.

Example 10 includes the pneumatic actuator system of example 6, wherein the portion of the pneumatic volume booster is a first portion, the first portion configured to receive a second portion of the pneumatic volume booster.

Example 11 includes the pneumatic actuator system of example 10, wherein the first portion and the second portion form the pneumatic volume booster.

Example 12 includes the pneumatic actuator system of example 6, wherein the cavities receive the pressurized fluid from a source external to the system and route the pressurized fluid to the cylinder.

Example 13 includes the pneumatic actuator system of example 6, wherein the cavities are formed via an additive manufacturing technique.

Example 14 includes a method comprising forming a first cavity of a portion of a pneumatic volume booster, the first cavity to provide a first fluid passageway to receive a pressurized fluid from an external source, forming a second cavity of the portion of the pneumatic volume booster, the second cavity to provide a second fluid passageway to route the pressurized fluid to an internal chamber of a pneumatic actuator, and forming a third cavity of the portion of the pneumatic volume booster, the third cavity to control a flow of the pressurized fluid between the first fluid passageway and the second fluid passageway.

Example 15 includes the method of example 14, further including forming the first cavity, the second cavity, and the third cavity within a pneumatic actuator end cap.

Example 16 includes the method of example 15, wherein the pneumatic actuator end cap is a first pneumatic actuator end cap, the method further including coupling a second pneumatic actuator end cap to the first pneumatic actuator end cap.

Example 17 includes the method of example 14, wherein the portion of the pneumatic volume booster is a first portion, further including coupling a second portion of the pneumatic volume booster.

Example 18 includes the method of example 17, wherein the first portion and the second portion form the pneumatic volume booster.

Example 19 includes the method of example 14, further including forming a fourth cavity of a portion of a second pneumatic volume booster, the fourth cavity to provide a third fluid passageway to receive the pressurized fluid from the external source, forming a fifth cavity of the portion of the second pneumatic volume booster, the fifth cavity to provide a fourth fluid passageway to route the pressurized fluid to the internal chamber of the pneumatic actuator, and forming a sixth cavity of the portion of the second pneumatic volume booster, the sixth cavity to control a second flow of the pressurized fluid between the third fluid passageway and the fourth fluid passageway.

Example 20 includes the method of example 14, further including forming the first cavity, the second cavity, and the third cavity via an additive manufacturing technique.

From the foregoing, it will be appreciated that example methods, apparatus and articles of manufacture have been disclosed that substantially eliminate the need to provide excess air tubes, fittings, air connections, and holes after a pneumatic and/or other piston actuator is manufactured. Examples disclosed herein improve reliability, reduce cost, reduce weight, and enable efficient maintenance of pneumatic and/or other piston actuators that include one or more volume boosters. Additionally, examples disclosed herein improve maintenance of pneumatic and/or other piston actuators that include one or more volume boosters because upgrades and/or changes to an existing pneumatic and/or other piston actuators can be made by exchanging endcaps, as opposed to disassembling and reassembling an entire volume booster system.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A pneumatic actuator end cap comprising:
a unitary body structured to couple to a pneumatic actuator, the body having a first surface, a second surface opposite the first surface, and an annular side wall between the first surface and the second surface, the body including a first portion of a volume booster integrally formed with the body, the first portion of the volume booster including:

a first cavity formed in the annular side wall to provide a first fluid passageway to receive a first pressurized fluid from a source external to the pneumatic actuator end cap;

a second cavity formed in the second surface to provide a second fluid passageway to route the pressurized fluid to an internal chamber of a pneumatic actuator structured to receive a piston;

a third cavity formed at least partially between the first surface and the second surface; and a fluid valve positioned at least partially in the third cavity to control a flow of the pressurized fluid between the first fluid passageway and the second fluid passageway; and;

a cover defining a second portion of the volume booster, the cover to couple to the first portion of the volume booster defined by the body, the cover to enclose the third cavity when the cover is coupled to the body, the cover including a fourth cavity defining a third fluid passageway to receive a second pressurized fluid external to the pneumatic actuator end cap, the second pressurized fluid being different than the first pressurized fluid, the second pressurized fluid providing a pilot signal to the fluid valve positioned at least partially in the third passageway to regulate an output of the volume booster.

2. The pneumatic actuator end cap of claim 1, further including a fifth cavity, and a sixth cavity, the fifth cavity to provide a fluid passageway to route the pressurized fluid to the internal chamber, the sixth cavity containing a second fluid valve to control a second flow of the second pressurized fluid between the third fluid passageway and the fourth fluid passageway.

3. The pneumatic actuator end cap of claim 1, wherein the first portion is configured to receive a second portion of the volume booster.

4. A pneumatic actuator system comprising:
a cylinder defining a pressure chamber structured to receive a piston; and
an end cap coupled to the cylinder, the end cap including a body having a first surface, a second surface, and an annular flange positioned between the first surface and the second surface; the body including a plurality of pneumatic volume boosters radially spaced relative to a longitudinal axis of the end cap, each of the volume boosters including a plurality of cavities integrally formed in the body of the end cap, the cavities of respective ones of the volume boosters to provide fluid passageways to control a flow of a first pressurized fluid within the system, each of the volume boosters including at least a first cavity formed in the annular flange to define a first inlet port to receive a supply fluid from a supply source and a second cavity in the second surface to define a first outlet port in fluid communication with the pressure chamber of the cylinder.

5. The pneumatic actuator system of claim 4, wherein the pneumatic volume boosters include a first pneumatic volume booster, a second pneumatic volume booster, a third pneumatic volume booster, and a fourth pneumatic volume booster.

6. The pneumatic actuator system of claim 4, wherein each of the volume boosters provides second fluid passageways to control a second flow of the pressurized fluid within the system different than the first pressurized fluid.

7. The pneumatic actuator system of claim 4, wherein each of the volume boosters includes a first portion integrally formed with the body and a second portion removably coupled to the first portion, the first portion configured to receive the second portion to define a respective one of the volume boosters.

8. The pneumatic actuator system of claim 4, wherein the cavities receive the first pressurized fluid from a source external to the system and route the first pressurized fluid to the cylinder.

9. The pneumatic actuator system of claim 4, wherein the cavities are formed via multiple layers of material.

10. A method comprising:
forming an end cap of a pneumatic actuator, the end cap having a first wall, a second wall and an annular side wall positioned between the first wall and the second wall, the annular side wall being non-parallel relative to at least one of the first wall or the second wall, during formation of the end cap:

forming a plurality of first portions of volume boosters with the end cap, the first portions of the volume boosters being radially spaced relative to a longitudinal axis of the end cap, formation of each of the first portions of the volume boosters including:
forming a first cavity in the side wall of the end cap, the first cavity to provide a first fluid passageway to receive a first pressurized fluid from an external source;
forming a second cavity in at least a portion of the second wall of the end cap, the second cavity to provide a second fluid passageway to route the first pressurized fluid to an internal chamber of pneumatic actuator; and
forming a first part of a third cavity between the first wall and the second wall; and
forming a flow control valve in at least the first part of the third cavity, the flow control valve to control a flow of the first pressurized fluid between the first fluid passageway and the second fluid passageway; and forming a plurality of second portions of the volume boosters, ones of the second portions to couple to respective ones of the first portions, each of the second portions defining a second part of the third cavity when coupled to respective ones of the first portions, each of the second portions including a third fluid passageway to receive a second pressurized fluid, the second pressurized fluid being different than the first pressurized fluid, the second pressurized fluid providing a pilot signal to regulate an output of the volume boosters.

11. The method of claim 10, wherein the pneumatic actuator end cap is a first pneumatic actuator end cap, the method further including coupling a second pneumatic actuator end cap to the first pneumatic actuator end cap.

12. The method of claim 10, wherein the first portions and the second portions form the pneumatic volume boosters.

13. The method of claim 10, further including forming the end cap via an additive manufacturing technique.

14. The method of claim 10, wherein the volume boosters and the end cap are formed via multiple layers of material.

* * * * *